Figure 3:
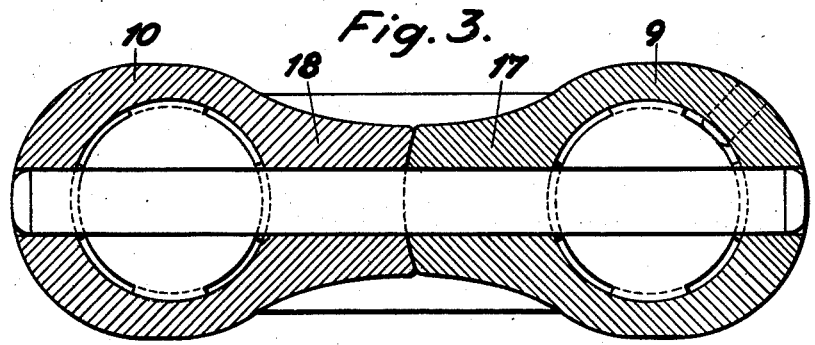

Oct. 10, 1950          K. W. SKÖLD          2,524,935
SHACKLE, PARTICULARLY FOR SHIP AND ANCHOR CHAINS
Filed Nov. 19, 1945          2 Sheets-Sheet 1
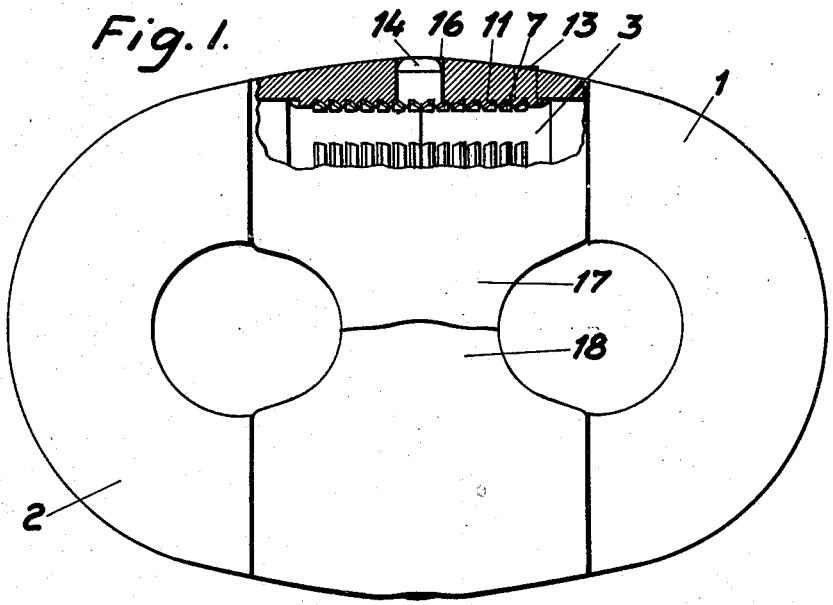
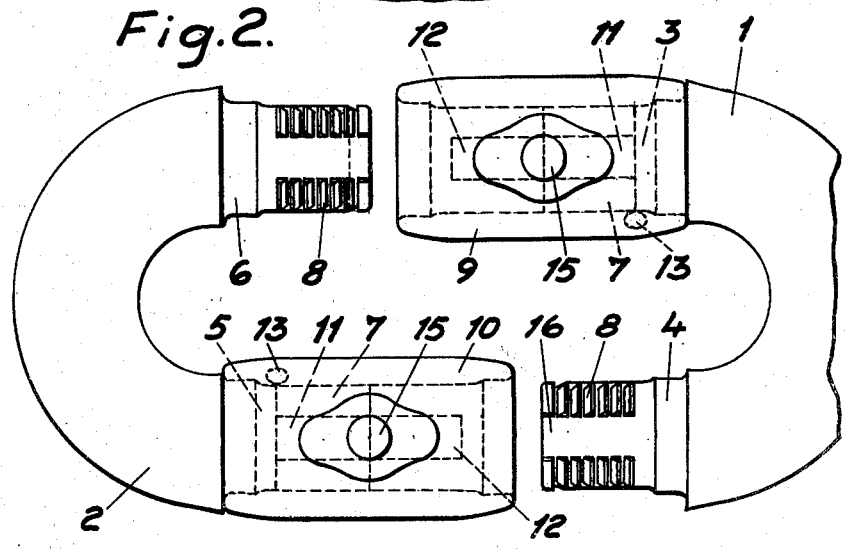
Inventor:
Karl W. Sköld
by Richardson, Davis & Norton
Attorneys Patented Oct. 10, 1950

2,524,935

UNITED STATES PATENT OFFICE 2,524,935

SHACKLE, PARTICULARLY FOR SHIP AND ANCHOR CHAINS

Karl Werner Sköld, Ramnas, Sweden

Application November 19, 1945, Serial No. 629,472
In Sweden December 28, 1944

Section 1, Public Law 690, August 8, 1946
Patent expires December 28, 1964

3 Claims. (Cl. 59—85)

A chain of great length, for example an anchor-chain, the length of which often is from 500 to 600 meters, can not and must not, inter alia for reasons of manufacture and reliability, be produced in a single closed length. Therefore, it must be assembled of several relatively short lengths, usually of about 15 English fathoms≅ 27.4 meters. Consequently the chain must be lengthened which is accomplished by means of so-called shackles which, besides constituting joining members, also must be adapted to be locked and opened in a relatively short time.

The last mentioned qualities are of course of very great importance, particularly in dangerous situations, for example in stormy weather when the anchor has stuck on the bottom and the ship can not get free. Such a dangerous situation often necessitates a quick cutting away of the anchor-chain which is effected by removing a suitable shackle.

It is clear from the above that the shackle is a very important, integral part of a ship-chain. Therefore it must satisfy the most rigorous demands, from qualitative as well as from operative point of view, as are reasonably thinkable.

These demands are:

(1) Great resistance.
(2) Robust and simple construction.
(3) Shape and dimension corresponding as much as possible to those of the usual chain, which results in a perfect running in the messenger.
(4) Few loose parts so as to reduce risk of losing.
(5) As quick coupling moments as possible.

The shackles hitherto known have only partially satisfied the said demands.

However, a shackle according to the invention satisfies all these demands. By the present invention a rather difficult and important problem has been satisfactorily solved.

According to the present invention these ends are attained by making a shackle which consists of two substantially U-shaped halves, the leg ends of which are provided with projections or recesses, for example cam segments, which are adapted to engage corresponding recesses or projections, for example cam segments on two sockets which are rotatable about the legs, the internal wall of each socket having projections, the said projections being arranged in such a way that they lock against one another when the projections of the leg ends engage the projections of the sockets and are held in this position by means of a lockpeg inserted through diametrical holes in the sockets, the said lock peg being bent a little in uninserted state, so that there is frictional engagement between the wall of the opening and the peg or pin.

Figure 4:
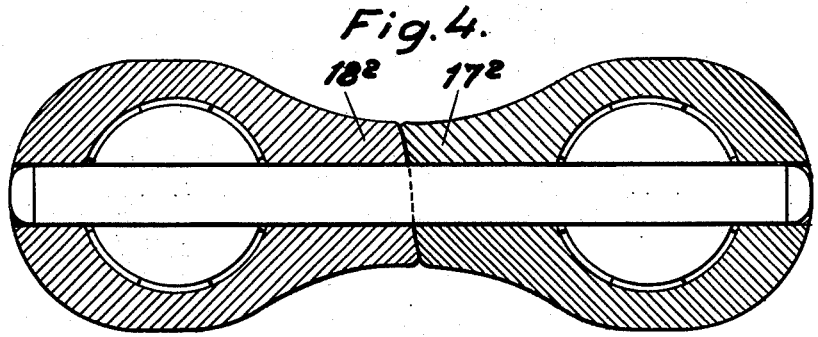
Figure 5:
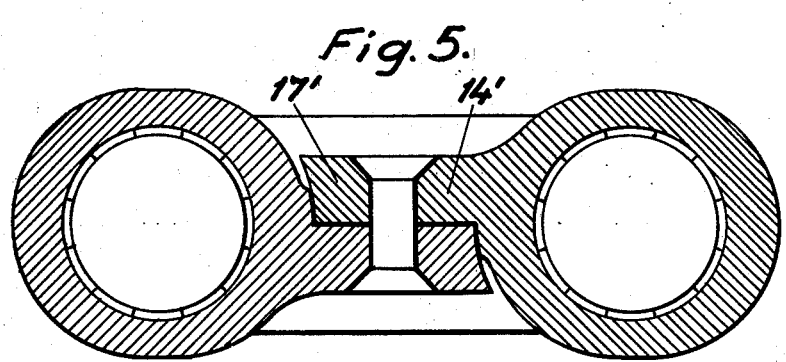

The invention is illustrated by some examples on the accompanying drawing, in which: Fig. 1 is a plan view, partly in section, of a shackle according to the invention. Fig. 2 shows the halves of the shackle with corresponding sockets. Figs. 3, 4, 5 show cross sections of different embodiments of sockets.

On the drawing the reference numerals 1 and 2 designate two substantially U-shaped halves, the leg ends 3, 4, and 5, 6 respectively, of which are provided with cam segments 7, and 8 respectively. A socket 9, and 10 respectively, is pushed over one leg end 3, and 5 respectively, of each half 1, and 2 respectively, the said sockets being internally provided with cam segments 11, and 12 respectively, the form of which corresponds to the cam segments of the leg ends. In order to retain the sockets 9 and 10 on their respective leg end 3 and 5, a stop pin 13 is screwed into each socket. When the cam segments 11 of the socket 9, and 10 respectively, do not engage the cam segments 7, and 8 respectively, of the respective leg ends 3, and 5 respectively, the said stop pin enters behind the last mentioned cam segment. The cam segments can be two or more, preferably four as shown on the drawing.

When the shackle is to be assembled, the leg ends 5 and 6 are inserted in the respective sockets 9 and 10 and the sockets are then turned so much that the cam segments of the leg ends and of the sleeves engage one another, in the shown example 90°, and are locked in this position by means of a lock peg 14, the said lock peg being inserted through diametrical holes 15 in the sockets and recesses 16 in the leg ends. The lock peg 14 is cylindrical and bent a little in uninserted state, in order that it shall be saretly retained through the friction when inserted into the straight canal 15. Each socket 9 and 10 has a lateral projection 17, 18, which is formed in such a way that they each contact the other when the cam segments engage one another. Their contact surfaces can be formed as cylindric surfaces for example, with their axes coinciding with the axis of one of the sleeves (9) (Fig. 3) or with a slightly S-formed contour (Fig. 4) or with substantially Z-formed contour (Fig. 5). In the last mentioned case the lock peg 14' can traverse the projections 17', 18' in their transverse direction and be riveted on.

Having now described my invention, what I claim as new and desire to secure by Letters Patent is:

1. A shackle for chain or the like comprising a pair of opposing U-shaped segments, the legs thereof adapted to abut one another, and a sleeve connecting each pair of abutting legs, the opposing legs of each pair having oppositely directed rows of cam segments raised on its periphery and a substantially plane portion on each leg between said rows of segments, said plane portion lying in a plane substantially coincident with the base of the segments so as to provide a recess between said rows, the internal wall of said sleeve being provided with corresponding rows of cam segments oppositely facing from the center of the sleeve outwardly, said rows of segments being separated by plane recesses corresponding to the recesses of said legs, the parts being so constructed and arranged that when the legs are brought into abutting relation within the sleeves, the cam segments on the sleeves will pass into the corresponding recesses on the legs, and a partial rotation of the sleeve about said legs will lock them together.

2. A shackle according to claim 1, each sleeve having an opening extending through the wall thereof, and a pin extending through said opening and frictionally engaging the wall thereof, and projecting into a recess on said legs to lock said sleeve against rotation on said legs.

3. A shackle for chain or the like comprising a pair of opposing U-shaped segments, the legs thereof adapted to abut one another, and a sleeve connecting each pair of abutting legs, the opposing legs of each pair having oppositely directed rows of cam segments raised on its periphery and a substantially plane portion on each leg between said rows of segments, said plane portion lying in a plane substantially coincident with the base of the segments so as to provide a recess between said rows, the internal wall of said sleeve being provided with corresponding rows of cam segments oppositely facing from the center of the sleeve outwardly, said rows of segments being separated by plane recesses corresponding to the recesses of said legs, the parts being so constructed and arranged that when the legs are brought into abutting relation within the sleeves, the cam segments on the sleeves will pass into the corresponding recesses on the legs, and a partial rotation of the sleeve about said legs will lock them together, and a stop pin in said sleeve for engaging a cam segment rearmost from the end of the leg to retain said sleeve on said leg when the U-shaped segments are disengaged.

KARL WERNER SKÖLD.

REFERENCES CITED

The following references are of record in the file of this patent:

UNITED STATES PATENTS

| Number | Name | Date |
|---|---|---|
| 1,372,485 | Coughlin | Mar. 22, 1921 |
| 1,454,335 | Prendergast | May 8, 1923 |
| 1,559,106 | Julstedt | Oct. 27, 1925 |
| 2,347,088 | Dock | Apr. 18, 1944 |